United States Patent [19]

Okabe

[11] Patent Number: 4,743,225
[45] Date of Patent: May 10, 1988

[54] AUTO-TENSIONER FOR TIMING-BELT
[75] Inventor: Yoshio Okabe, Ciryu, Japan
[73] Assignee: Aisin Seiki Kabushiki Kaisha, Kariya, Japan
[21] Appl. No.: 767,423
[22] Filed: Aug. 20, 1985
[30] Foreign Application Priority Data Aug. 29, 1984 [JP] Japan ............... 59-130836[U]

[51] Int. Cl.[4] .............................................. F16H 7/12
[52] U.S. Cl. ..................................... 474/133; 474/135
[58] Field of Search ............... 474/101, 104, 109, 110, 474/133, 135

[56] References Cited

U.S. PATENT DOCUMENTS 3,187,674  6/1965  Hammelmann ................. 474/110 X
4,300,890  11/1981  Hallmann et al. ................ 474/110

FOREIGN PATENT DOCUMENTS 2144688  3/1973  Fed. Rep. of Germany ...... 474/110
3211095  10/1982  Fed. Rep. of Germany ...... 474/110

Primary Examiner—Stephen J. Novosad
Assistant Examiner—Thomas J. Odas
Attorney, Agent, or Firm—Oblon, Fisher, Spivak, McClelland & Maier

[57] ABSTRACT

An auto-tentioner of timing-belt used for apparatus such as automobiles, which comprises a body, a plunger inserted into the body, a piston inserted in the pluner and protruding from the body so as to push the timing-belt, and a spring at the rear end of the body and pushing the body to the direction of timing-belt, thereby making it possible for the auto-tentioner fully to follow up the extraordinary expansion of the timing-belt.

1 Claim, 2 Drawing Sheets

AUTO-TENSIONER FOR TIMING-BELT

FIELD OF THE INVENTION

This invention relates to an auto-tensioner used for the timing belt in apparatus such as automobiles.

DESCRIPTION OF THE PRIOR ART

Various types of auto-tensioners for preventing the slackening of the timing belt for automobiles have been proposed. One example of the sealed-type auto-tensioner is mentioned in FIG. 2 attached hereto. In FIG. 2, inner body 2 is screwed and fixed in outer body 1, and plunger 4 is slidably disposed in the inner body so as to form large oil chamber 3. Plunger 4 is continuously biased in the direction of the large oil chamber by spring 5. In plunger 4, free piston 7 is slidably disposed so as to form small oil chamber 6 and both oil chamber 3 and 6 communicate with each other through check valve 8. The numeral 9 is an idler pulley, the numeral 10 is a crank pulley, the numeral 11 is a timing belt.

The leading end of piston 7 is in contact with idler pulley 9 and appropriate tension is applied to timing belt 11. When timing belt 11 slackens, free piston 7 extends and idler pulley 9 rotates counterclockwise around fulcrum 9a as shown by two-dot chain lines, thereby the slackening of timing belt 11 being compensated and appropriate tension being restored.

The conventional auto-tensioner of this type, however, has a drawback in that the range in which it can follow up the change of the belt length is limited as the range of operation stroke is limited, and consequently, it cannot follow up an extraordinary expansion of timing belt.

SUMMARY OF THE INVENTION

The object of the present invention is to provide a auto-tensioner which can follow up the extraordinary expansion of timing-belt.

In accordance with the present invention, the tensioner body is biased in the same direction as the direction of the free piston by a spring which has a spring force as strong as possible within the range which does not exceed the endurance limit of the timing belt.

The auto-tensioner of the present invention is equipped with a body, a plunger slidably inserted in said body, a free piston slidably inserted in said plunger, and a spring accommodated in the spring box which pushes the trailing end of the body in the direction in which the free piston pushes the timing belt. The spring force of said spring is sufficiently large within a range so as to not exceed the endurance limit of the timing belt.

In the above configuration, the spring yields to prevent the belt from breaking when the belt is subjected to abnormal tension by its elongation exceeding the adjusting capacity of the auto-tensioner by the cause such as thermal expansion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF PREFERRED EMBODIMENT

Figure 1:
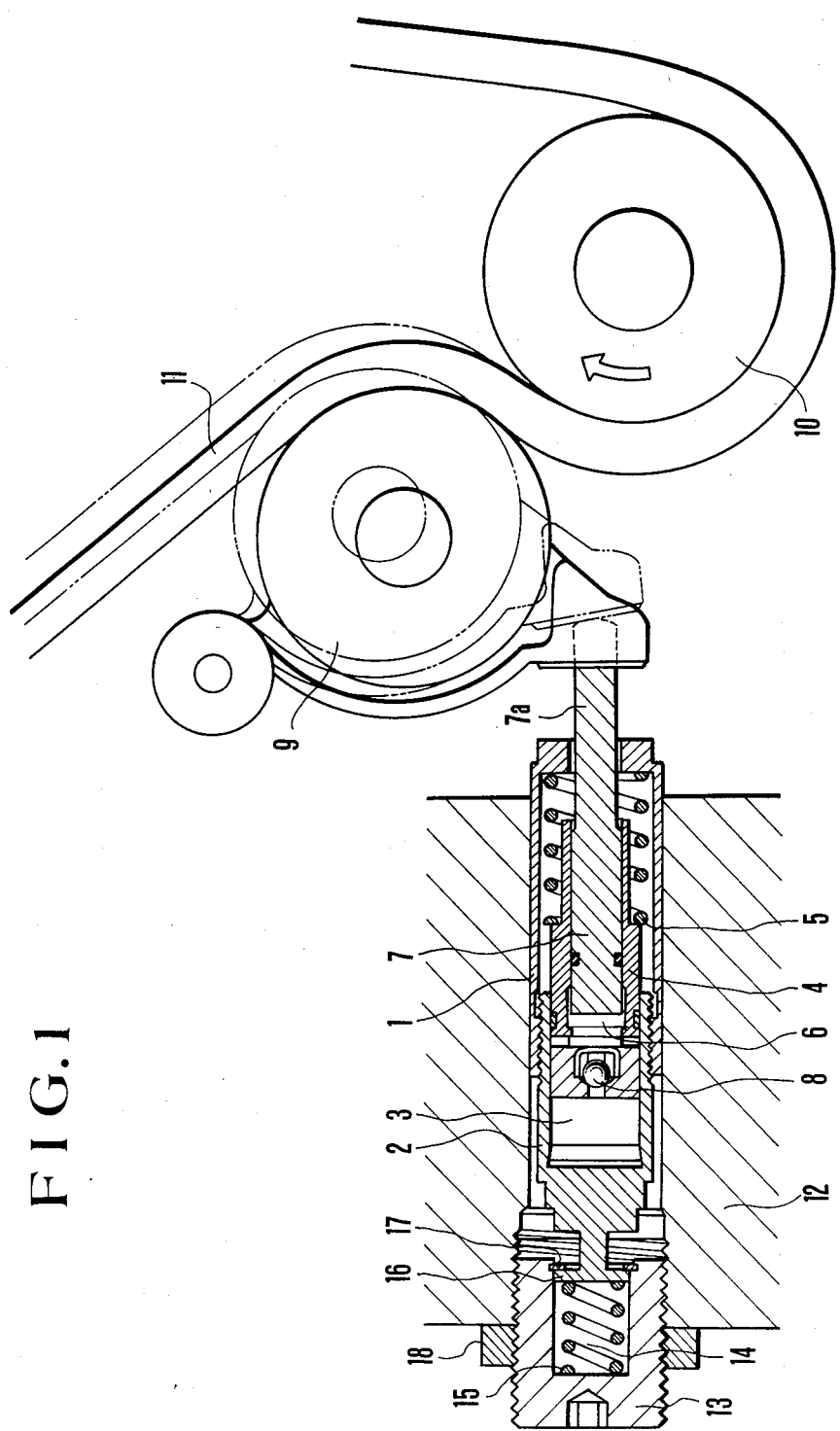
FIG. 1 shows a sectional side view of an embodiment of the auto-tensioner of the present invention.
Figure 2:
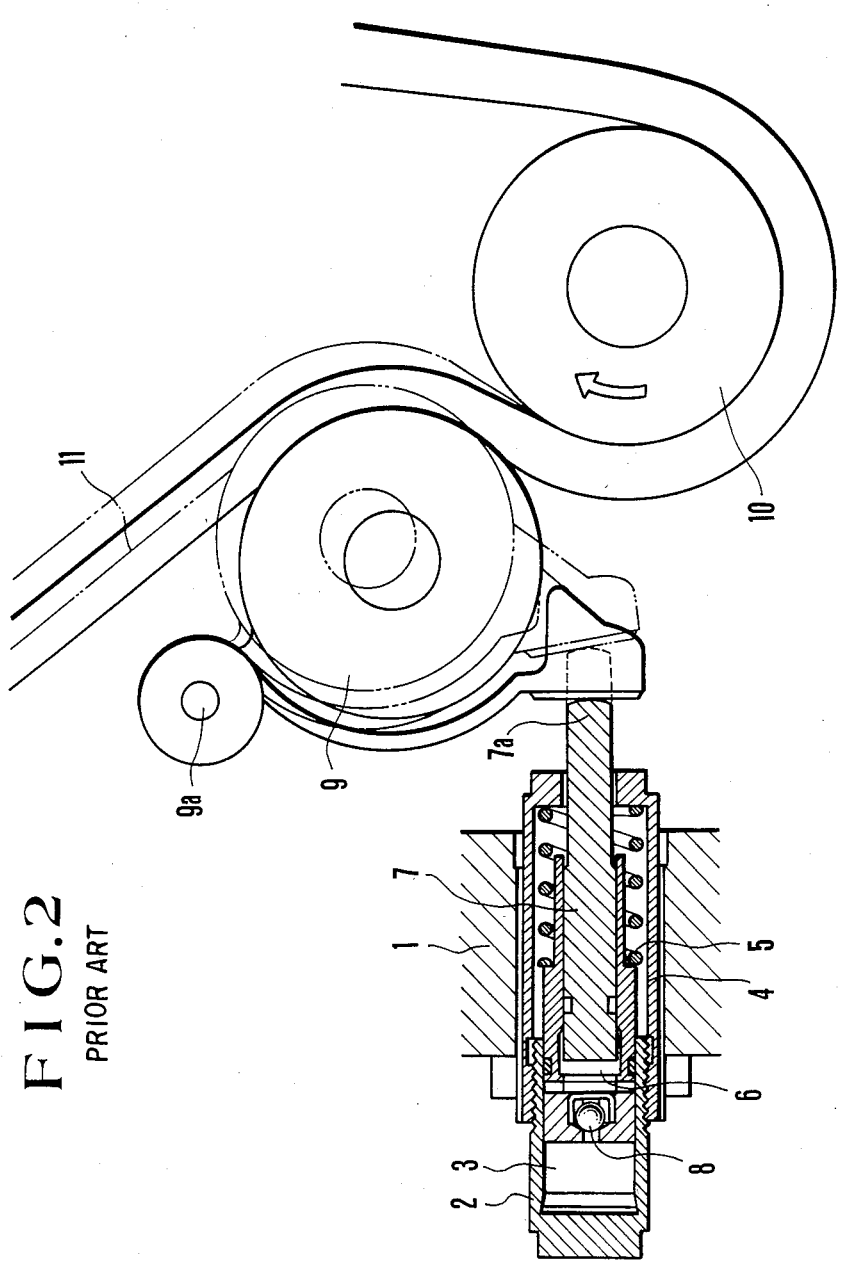
FIG. 2 shows a sectional side view of a conventional auto-tensioner.

Referring to FIG. 1 which shows an embodiment of the auto-tensioner of the present invention, there are provided an outer body 1, inner body 2, large oil chamber 3, plunger 4, spring 5, small-oil chamber 6, free piston 7, leading end of piston 7a, check valve 8, idler pulley 9, crank pulley 10 and timing belt 11, identical with the conventional auto-tensioner shown in FIG. 2.

Outer body 1 is slidably fitted to block 12 and the trailing end (left end) of inner body 2 is biased by spring 15 in spring box 14 formed in plug 13 to the direction of pushing idler pulley 9 through plate 16. Plate 16 is held in spring box 14 through snap spring 17. Plug 13 is screwed into block 12 and is fixed in the position adjusted by nut 18. The load of spring 15 is set at a value as large as possible unless exceeds the endurance limit of the timing belt. Spring 15 in spring box 14 yields so as to prevent the timing belt from breaking when the timing belt is subjected to abnormal tension by the elongation by thermal expansion or other cause exceeding the adjusting capacity of the autotensioner.

It is further understood by those skilled in the art that the foregoing description is a preferred embodiment of the disclosed device and that various changes and modifications may be made in the invention without departing from the spirit and scope thereof.

What is claimed as new and desired to be secured by Letters Patent of the United States is:

1. An auto-tensioner for timing-belts, comprising:
   a cylindrical body slidably supported by a base member,
   a plunger slidably inserted into said cylindrical body,
   a piston slidably inserted into said plunger, one end of said piston protruding from one end of said cylindrical body to contact an idler pulley for giving tension to the timing belt by hydraulic pressure, and
   a spring accommodated in a spring box formed in said base member, said spring pushing another end of said cylindrical body in the same direction as said piston pushing the idler pulley, wherein said spring has a spring force as large as allowable within the range not exceeding an endurance limit of the timing belt.

* * * * *

UNITED STATES PATENT AND TRADEMARK OFFICE
CERTIFICATE OF CORRECTION

PATENT NO. : 4,743,225
DATED : May 10, 1988
INVENTOR(S) : OKABE et al.

It is certified that error appears in the above-identified patent and that said Letters Patent is hereby corrected as shown below: Title page:

In the Abstract, lines 1 and 7, change "auto-tentioner" to --auto-tensioner--; line 1, change "of" to --for a--; line 2, change "comprises" to --includes--; line 3, change "pluner" to --plunger--; line 5, after "spring" insert --located--, and after "and" (second occurrence) insert --for--; and line 6, change "to" to --in--, and after "of" insert --the--.

At Column 2, line 29, after "unless" insert --such--; and line 34, change "autotensioner" to --auto-tensioner--.

Signed and Sealed this

Thirteenth Day of December, 1988

Attest:

DONALD J. QUIGG

*Attesting Officer*          *Commissioner of Patents and Trademarks*